United States Patent Office 2,728,770
Patented Dec. 27, 1955

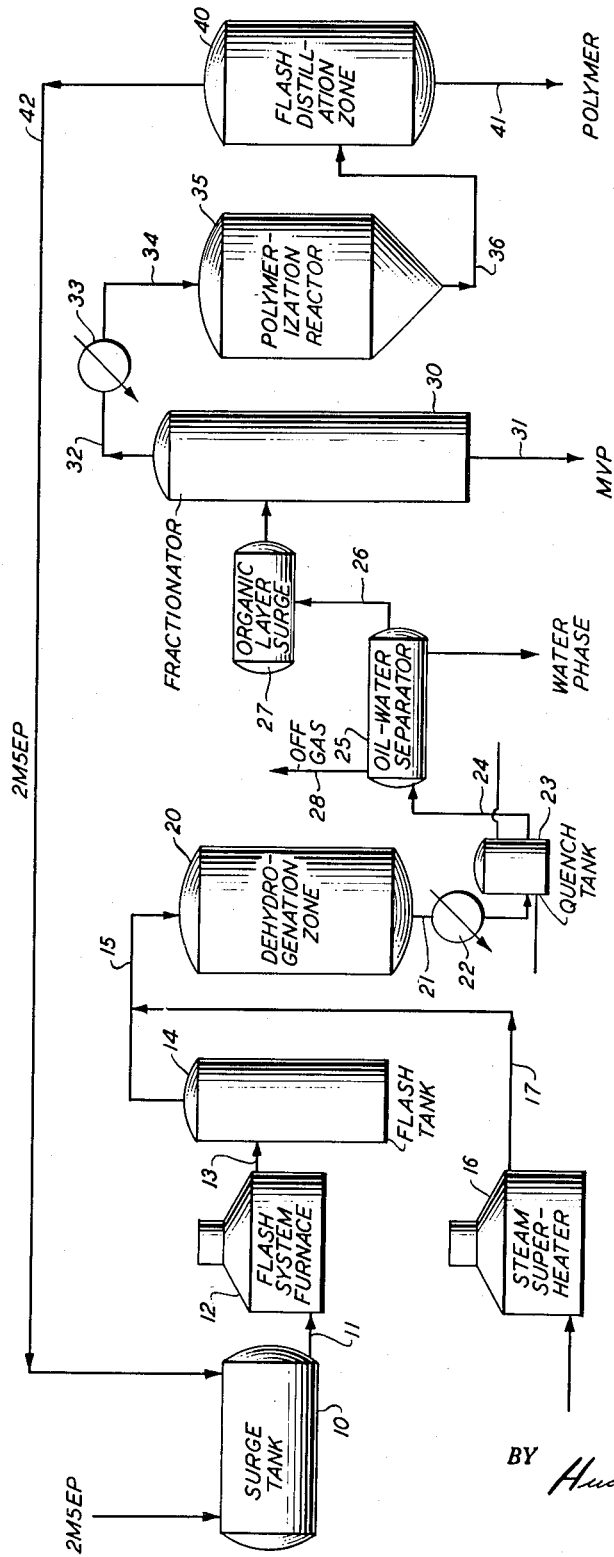

2,728,770

PROCESS FOR THE PRODUCTION OF ALKENYL PYRIDINES

John E. Mahan, Bartlesville, Okla., assignor to Phillips Petroleum Company, a corporation of Delaware Application July 24, 1952, Serial No. 300,622

13 Claims. (Cl. 260—290)

This invention relates to an improved process for the production of alkenyl pyridines. In one of its aspects this invention relates to an improved process for the production of 2-methyl-5-vinylpyridine. In another of its aspects this invention relates to a method of purifying an alkyl pyridine stream containing small amounts of alkenyl pyridines.

In the manufacture of vinylpyridines by the catalytic dehydrogenation of the corresponding ethylpyridines, it is very difficult in certain instances to separate the various vinylpyridines which are produced from the ethylpyridine starting material. For example, in the catalytic dehydrogenation of 2-methyl-5-ethylpyridine to form 2-methyl-5-vinylpyridine, I have found that some 3-vinylpyridine is also produced. The boiling points of the compounds in the mixture are such that it is extremely difficult to separate completely this 3-vinylpyridine, and possibly also other vinylpyridines, from the 2-methyl-5-ethylpyridine by fractional distillation. Since only a portion of the methylethylpyridine feed is converted in each pass through the dehydrogenation zone, it is necessary to recycle the unconverted material. I have discovered that if the recycle stream contains any appreciable quantity of vinylpyridines, and is passed without treatment to the catalytic dehydrogenation step, undue fouling of the initial portion of the catalyst bed which is hottest, will result. I have also found that if present in the recycle stream these compounds will polymerize in the 2-methyl-5-ethylpyridine preheater and vaporizer and eventually these units will become plugged with polymer. The present invention provides for essentially complete removal of the polymerizable compounds from this recycle stream. Likewise, the present invention removes the 3-vinylpyridine to prevent this component from building up to an undesirably large proportion of the stream being dehydrogenated.

Accordingly, it is an object of this invention to provide an improved process for the production of alkenyl pyridines.

Another object of this invention is to provide an improved process for the production of 2-methyl-5-vinylpyridine.

Still another object of this invention is to provide a process for the purification of an alkyl pyridine stream containing small amounts of alkenyl pyridines.

A further object of this invention is to provide an improved process for removing undesirable alkenyl pyridine from an alkyl pyridine stream subjected to catalytic dehydrogenation.

Still another object of this is to prevent undue fouling of the initial portion of the catalyst bed in the catalytic dehydrogenation of an alkyl pyridine.

Yet another object of this invention is to prevent undue fouling of the preheater and vaporizer in the catalytic dehydrogenation of an alkyl pyridine.

Further and additional objects will be apparent from reading the accompanying disclosure and drawing.

The drawing is a schematic flowsheet showing one embodiment of my invention wherein methylvinylpyridine is produced from methylethylpyridine.

Broadly my process involves subjecting an alkyl pyridine to a catalytic dehydrogenation treatment. The effluent from said dehydrogenation treatment is separated into two portions, A and B, A comprising alkenyl pyridines, and B comprising a mixture of unreacted alkyl pyridine and a small amount of alkenyl pyridine. I subject the mixture (B portion) to a polymerization treatment to polymerize alkenyl pyridine contained therein and then separate the thus-formed polymer therefrom. The unreacted alkyl pyridine is then recycled to the catalytic dehydrogenation treatment. My process is particularly useful where the alkenyl pyridines are difficultly separable from the alkyl pyridine by ordinary fractionation methods such as distillation and solvent extraction.

The process of this invention is applicable to alkyl pyridines where at least one alkyl group is present which contains at least two carbon atoms. Di-, tri-, and tetraalkyl pyridines can be dehydrogenated with the alkyl substituents being present in various positions on the pyridine nucleus. Polyvinylpyridines as well as monovinyl-pyridines can be prepared according to this process. It is understood that the vinylpyridines produced can contain one or more vinyl groups and also one or more alkyl groups, particularly the methyl group. 2-methyl-5-vinylpyridine is one of the preferred compounds which is prepared by dehydrogenation of 2-methyl-5-ethylpyridine. Other examples are: 2-ethyl-4-ethylpyridine, 2-ethylpyridine, 2-ethyl-5-ethylpyridine, 3-ethylpyridine, 3-propylpyridine, 2-n-amylpyridine. Alkyl quinolines and other compounds having at least one alkyl group, containing at least two carbon atoms, attached to a pyridine nucleus and further having non-interfering groups attached to or fused with the pyridine nucleus, can also be dehydrogenated by the method of my invention. Examples are ethylquinolines, alkyl pyridines having a chlorine or nitro group substituted on a carbon atom of the pyridine nucleus, and the like.

I have discovered that although vinylpyridines, consisting mainly of 3-vinylpyridine, are present in relatively small quantities, usually in the range of 3–5 weight per cent, in the recycle methylethylpyridine stream to a catalytic dehydrogenation treatment of methylethylpyridine, this material can be removed practically completely by either catalytic or thermal (non-catalytic) polymerization and subsequent separation of the polymer from the polymerization effluent.

The thermal polymerization can be carried out at temperature of 400 to 700° F., preferably 550 to 650° F. The reaction time will vary between 15 minutes and 5 hours, with the longer times being employed at the lower polymerization temperatures. The reaction is carried out under sufficient pressure to maintain the reacting mixture in the liquid phase.

The catalytic polymerization can be carried out at temperature of 250 to 700° F., depending to some extent on the type and amount of catalyst employed. The amount of catalyst employed will be generally in the range of 0.1 to 2 weight per cent. Reaction times will usually vary from 15 minutes to 5 hours, preferably from 30 minutes to 3 hours. Catalysts which can be employed include peroxy compounds, Friedel-Crafts type, solid contact type, diazo thio ether type, bis-azoalkylnitrile type such as bis-azoisobutyronitrile and the like. Examples of these and other types are hydrogen peroxide, sodium peroxide, di-tert-butyl peroxide, tert-butyl hydroperoxide, acetyl peroxide, benzoyl peroxide, perchloric acid, persulfuric acid, phenyldimethylhydroperoxymethane (also called cumene hydroperoxide), (tert-butylphenyl)dimethylhydroperoxymethane, (chlorophenyl)dimethylhydroperoxymethane, decylethylmethylhydroperoxymethane, phenylcyclohexane hydroperoxide, octahydrophenanthrene hydroperoxide, stannic chloride, aluminum chloride, boron trifluoride, boron trifluoride complexes, (methoxy-benzene diazo mercapto)naphthalene, (dimethylbenzene diazo mercapto)naphthalene, (chlorobenzene diazo mercapto)-isobutane, and p-nitrobenzenediazonium fluoborate known as (Nitrazole CF). The organic peroxides and hydroperoxides are among the preferred catalysts for this process. In some instances it will also be desirable to employ a small proportion of an acid, such as hydrochloric or sulfuric, in combination with the peroxy compound.

It is preferable to employ polymerization conditions which will yield a polymer having as low a viscosity as possible to facilitate removal of this material from a flashing zone in which the methylethylpyridine can be separated from the polymer. It is preferred that a temperature of at least 550° F. be employed in the polymerization of the vinylpyridine content of the methylethylpyridine recycle stream. Although polymer formed at lower temperatures, for example, at 350° F., is a solid material at room temperature, it can usually be liquefied by heating to between 340 and 360° F.

A preferred method of removing 3-vinylpyridine from the recycle methylethylpyridine is to thermally polymerize the vinylpyridine by heating the mixture at 600° F. for a period of from 30 minutes to one hour. An important advantage of this thermal polymerization is that no foreign material is introduced into the methylethylpyridine stream which is recycled through the vaporizer and to the dehydrogenation catalyst. Catalysts which might be employed in the polymerization might in certain instances poison the dehydrogenation catalyst or form decomposition products which would have a similar poisoning effect. Furthermore, a much more fluid polymer with better flow characteristics is obtained at the higher polymerization temperature.

It is an advantage of my method that substantially complete removal of the vinylpyridines can be obtained. Although it is desired to have the recycled methylethylpyridine stream completely free of vinylpyridines, as much as one per cent vinylpyridines can be tolerated in most cases.

While this invention has been described for the removal of relatively small quantities of 3-vinylpyridine from 2-methyl-5-ethylpyridine, it is likewise applicable to the removal of small quantities of other vinylpyridines from alkyl pyridine streams. It is also applicable for the removal of larger quantities of alkylpyridines if this becomes necessary. It has particular utility for purifying those streams which are not readily purified by distillation. It is much simpler and much less expensive to separate a small amount of a vinylpyridine by thermal polymerization and a subsequent simple flash distillation than it is to separate the same impurity by employing a fractionation system of 100 or more theoretical plates at a high reflux ratio.

Referring now to the drawing in detail, 2-methyl-5-ethylpyridine in surge tank 10 is passed by line 11 to furnace 12 where it is heated and then via line 13 to flash tank 14 where it is vaporized. Vaporized methylethylpyridine leaving flash tank 14 via line 15 at a temperature of about 390° F. and about 30 pound per square inch absolute is admixed with steam, heated in furnace 16 and passed through line 17, in a ratio of about 3.5:1 to 7.0:1 pounds of steam per pound of methylethylpyridine. The steam is sufficiently superheated that the mixture enters dehydrogenation zone 20 at a temperature of about 1200° F. Dehydrogenation catalysts as described and claimed in my copending applications Serial No. 244,469, filed August 30, 1951 and Serial No. 264,837, now abandoned, filed January 3, 1952 can be employed. A preferred dehydrogenation catalyst contains 95 per cent $Fe_2O_3$, 3 per cent $Cr_2O_3$ and 2 per cent KOH. Total pressures for the reaction are generally in the range of 100 mm. of mercury to 25 p. s. i. g. Flow rates are advantageously in the range of 0.2 to 5 liquid volumes alkyl pyridine charged per volume of catalyst per hour, which corresponds to approximately 35 to 850 volumes gaseous alkyl pyridine (calculated at standard temperature and pressure) per volume catalyst per hour. Effluent leaving zone 20 via line 21 at a temperature of about 1150° F. is cooled to about 400° F. in heat exchanger 22 and then quenched to about 150° F. in quenching tank 23. The thus-cooled and liquefied mixture passes via line 24 to separator 25 where it is separated into an aqueous phase and an organic phase. Off-gas comprised largely of hydrogen leaves separator 25 through line 28. The organic phase is passed via line 26 to surge tank 27 and then to fractionator 30. The water phase from separator 25 can be further treated to remove dissolved organic material if desired. Fractionator 30 can comprise an ordinary fractionating column of the bubble cap-tray type or can be a packed column. Steam can be employed as a stripping medium therein. In either instance 2-methyl-5-vinylpyridine will be recovered as bottoms via line 31. This 2-methyl-5-vinylpyridine can be further purified if desired. Unreacted 2-methyl-5-ethylpyridine containing a small amount of vinylpyridines, about 5 weight per cent, including 3-vinylpyridine and a lesser amount of 2-methyl-5-vinylpyridine is recovered as overhead via line 32 and is condensed in condenser 33. If steam stripping is employed an oil-water separator must be employed between condenser 33 and reactor 35. The mixture of methylethylpyridine and small amounts of vinylpyridines is passed via line 34 to polymerization reactor 35 where it is subjected to a polymerization treatment as more fully described hereinbefore.

The effluent from polymerization reactor 35 is passed via line 36 to flash distillation zone 40 where the polymer is separated therefrom as bottoms via line 42. The thus-purified 2-methyl-5-ethylpyridine is recovered as overhead and is recycled via line 42 to surge tank 10 from whence it is again preheated and subjected to dehydrogenation.

Conventional equipment such as valves, pumps, and the like have been omitted from the drawing. However, those skilled in the art will readily appreciate the necessity of such items.

The following table shows the result of tests wherein small amounts of vinylpyridines were polymerized in the presence of large amounts of 2-methyl-5-ethylpyridine under various conditions of temperature, time and catalysts, and exemplify a variety of conditions which can be used in the polymerization step of my process.

TABLE

*Polymerization of low concentrations of vinylpyridine in 2-methyl-5-ethylpyridine*

| Test No. | Sample Composition A | Catalyst | Wt. Percent Compound in Sample B | Temperature, °F. | Time, Hrs. | Percent of Vinylpyridine Polymerized |
|---|---|---|---|---|---|---|
| 1 | 5% MVP, 95% MEP | Cumene Hydroperoxide | 0.4 | 332 | 3 | 100.0 |
| 2 | 5% MVP, 95% MEP | do | 0.2 | 332 | 3 | 90.6 |
| 3 | 5% MVP, 95% MEP | Boron Trifluoride | 0.2 | 332 | 3 | 13.1 |
| 4 | 5% MVP, 95% MEP | Aluminum Chloride | 0.2 | 332 | 3 | 11.4 |
| 5 | 2.75% 3-VP, 1.05% MVP, 96.2% MEP | None | | 600 | 1 | 100 |
| 6 C | 2.75% 3-VP, 1.05% MVP, 96.2% MEP | do | | 600 | 1 | 100 |
| 7 | 4.4% 3-VP, 95.6% MEP | do | | 600 | 1 | 100 |
| 8 | 4.0% MVP, 96% MEP | do | | 600 | 1 | 100 |
| 9 | 4.86% MVP, 95.14% MEP | do | | 600 | 1 | 100 |
| 10 | 4.86% MVP, 95.14% MEP | do | | 550 | 1 | 87.9 |
| 11 | 4.86% MVP, 95.14% MEP | do | | 500 | 3 | 94.5 |
| 12 | 4.86% MVP, 95.14% MEP | Di-t-butyl peroxide | 0.4 | 350 | 3 | 100 |
| 13 | 4.86% MVP, 95.14% MEP | do | 0.2 | 350 | 3 | 90.5 |
| 14 | 4.86% MVP, 95.14% MEP | Benzoyl peroxide | 0.4 | 350 | 3 | 69.0 |
| 15 | 25.4% MVP, 74.6% MEP | None | | 600 | D 1 | 100 |
| 16 | 25.4% MVP, 74.6% MEP | do | | 600 | D 0.25 | 100 |

A 3-VP, MVP, and MEP represent 3-vinylpyridine, 2-methyl-5-vinylpyridine, and 2-methyl-5-ethylpyridine, respectively.
B The catalyst concentrations shown are expressed as weight percent of the total charge (MEP plus vinylpyridine).
C Sample in contact with glass surface during polymerization.
D Time at 600° F.; approximately one hour was required to heat from room temperature to 600° F. in each run.

In those instances where the per cent conversion of vinylpyridine appeared to be low, better results are obtainable by varying the conditions, viz, increasing temperature, contact time and/or catalyst content.

While this invention has been described and exemplified in terms of its preferred embodiments those skilled in the art will readily appreciate that modifications can be made without departing from the spirit or scope of the invention.

I claim:

1. A process for the production of alkenyl pyridines which comprises subjecting an alkyl pyridine to a catalytic dehydrogenation treatment; separating the effluent from said dehydrogenation treatment into two portions comprising, A, alkenyl pyridine, and B, a mixture comprising unreacted alkyl pyridine and a small amount of polymerizable alkenyl pyridine; subjecting said mixture to a polymerization treatment to polymerize alkenyl pyridine therein; separating thus-formed polymer from unreacted alkyl pyridine; and recycling unreacted alkyl pyridine to said dehydrogenation treatment.

2. A process for the production of alkenyl pyridines which comprises pretreating an alkyl pyridine by vaporizing and admixing with super-heated steam; subjecting said treated mixture to a catalytic dehydrogenation treatment; cooling the effluent from said dehydrogenation treatment; separating said effluent from said dehydrogenation treatment into an aqueous phase and an organic phase; subjecting said organic phase to a fractionation treatment; recovering alkenyl pyridine as bottoms from said fractionation; recovering a mixture of unreacted alkyl pyridine and a small amount of polymerizable alkenyl pyridine as overhead from said fractionation; subjecting the thus-recovered mixture to a polymerization treatment to polymerize alkenyl pyridine therein; separating thus-formed polymer from unreacted alkyl pyridine; and recycling unreacted alkyl pyridine to the first-mentioned pretreatment steps and dehydrogenation.

3. A process for the production of a vinylpyridine which comprises pretreating an ethylpyridine by vaporizing and admixing with superheated steam; catalytically dehydrogenating a portion of said ethylpyridine; cooling the effluent from said dehydrogenation treatment; separating the effluent from said dehydrogenation treatment into an aqueous phase and an organic phase; fractionating said organic phase to produce as bottoms vinylpyridine; recovering as overhead from said fractionations a mixture of unreacted ethylpyridine and a small amount of vinylpyridine; condensing the thus-recovered mixture; subjecting the thus-recovered mixture to a thermal non-catalytic polymerization treatment at a temperature in the range of 400 to 700° F. for a period in the range of 15 minutes to 5 hours to polymerize vinylpyridine therein; separating thus-formed polymer from unreacted ethylpyridine by flash distillation; and recycling unreacted ethylpyridine to said first-mentioned pretreatment step.

4. A process for the production of a vinylpyridine which comprises pretreating an ethylpyridine by vaporizing and admixing with superheated steam; catalytically dehydrogenating a portion of said ethylpyridine; cooling the effluent from said dehydrogenation treatment; separating the effluent from said dehydrogenation treatment into an aqueous phase and an organic phase; fractionating said organic phase to produce as bottoms vinylpyridine; recovering as overhead from said fractionation a mixture of unreacted ethylpyridine and about five weight per cent vinylpyridine; subjecting the thus-recovered mixture to a catalytic polymerization treatment at a temperature in the range of 250 to 700° F. for a period in the range of 15 minutes to 5 hours in the presence of a polymerization catalyst selected from the group consisting of peroxy type catalysts, Friedel-Crafts type catalysts and diazo thio ether type catalysts, to polymerize vinylpyridine therein; separating thus-formed polymer from unreacted ethylpyridine; and recycling unreacted ethylpyridine to said first-mentioned pretreatment step.

5. A process according to claim 4 in which catalytic polymerization is effected in the presence of di-tert-butyl peroxide.

6. A process for the production of 2-methyl-5-vinylpyridine which comprises pretreating 2-methyl-5-ethylpyridine by vaporizing and admixing with superheated steam; subjecting the thus-treated 2-methyl-5-ethylpyridine to a catalytic dehydrogenation treatment at a temperature in the range of 1200 to 1300° F. and at a pressure in the range of 20 to 40 p. s. i. a. in the presence of a dehydrogenation catalyst; cooling the effluent from said dehydrogenation treatment to about 150° F.; separating thus-cooled effluent into an aqueous phase and an organic phase; fractionating the organic phase to recover as bottoms 2-methyl-5-vinylpyridine; recovering as overhead from said fractionation a mixture containing unreacted 2-methyl-5-ethylpyridine and about five weight per cent vinylpyridine; subjecting the thus-recovered mixture to a thermal polymerization treatment at a temperature in the range of 550 to 650° F. for a period in the range of 15 minutes to 5 hours and at a pressure sufficient to maintain the reacting mixture in the liquid phase to polymerize substantially all the vinylpyridine therein; separating thus formed polymer from unreacted 2-methyl-5-ethylpyridine by flash distillation; and recycling unreacted 2-methyl-5-ethylpyridine to said first-mentioned pretreatment step.

7. A process for the production of 2-methyl-5-vinylpyridine which comprises pretreating 2-methyl-5-ethylpyridine by vaporizing and admixing with superheated steam; subjecting the thus-treated 2-methyl-5-ethylpyridine to a catalytic dehydrogenation treatment at a temperature in the range of 1200 to 1300° F. and at a pressure in the range of 20 to 40 p. s. i. a. in the presence of a dehydrogenation catalyst; cooling the effluent from said dehydrogenation treatment to about 150° F.; separating thus-cooled effluent into an aqueous phase and an organic phase; fractionating the organic phase to recover as bottoms 2-methyl-5-vinylpyridine; recovering as overhead from said fractionation a mixture containing unreacted 2-methyl-5-ethylpyridine and about five weight per cent vinylpyridine; subjecting the thus-recovered mixture to a polymerization treatment at a temperature in the range of 550 to 650° F. for a period of 30 minutes to 3 hours in the presence of a polymerization catalyst selected from the group consisting of peroxy type catalysts, Friedel-Crafts type catalysts and diazo thio ether type catalysts to polymerize vinylpyridine present therein; separating thus-formed polymer from unreacted 2-methyl-5-ethylpyridine; and recycling unreacted 2-methyl-5-ethylpyridine to said first-mentioned pretreatment step.

8. A process according to claim 7 wherein the polymerization catalyst employed is cumene hydroperoxide.

9. A process according to claim 7 wherein the polymerization catalyst employed is di-tert-butyl peroxide.

10. A process for the production of 2-vinyl pyridine which comprises vaporizing 2-ethyl pyridine and admixing it with superheated steam; subjecting the gas mixture to catalytic dehydrogenation at a temperature in the range of 1200 to 1300° F. and at a pressure in the range of 20 to 40 p. s. i. in the presence of a dehydrogenation catalyst; cooling the effluent from said dehydrogenation treatment to about 150° F.; separating thus cool effluent into an aqueous phase and an organic phase; fractionating the organic phase to recover as bottoms 2-vinyl pyridine; recovering as overhead from said fractionation a mixture containing unreacted 2-ethyl pyridine and about five per cent by weight of vinyl pyridine; subjecting the thus recovered mixture to a thermal polymerization treatment at a temperature in the range of 550 to 650° F. for a period in the range of 15 minutes to 5 hours and at a pressure sufficient to maintain the reacting mixture in the liquid phase to polymerize substantially all the vinyl pyridine therein; separating thus formed polymer from unreacted 2-ethyl pyridine by flash distillation; and recycling said unreacted 2-ethyl pyridine to the first step of the process.

11. A process for the production of 2,5-divinyl pyridine which comprises pretreating 2,5-diethyl pyridine by vaporizing and admixing with superheated steam; subjecting the gas mixture to a catalytic dehydrogenation treatment at a temperature in the range of 1200 to 1300° F. and a pressure in the range of 20 to 40 p. s. i. in the presence of a dehydrogenation catalyst; cooling the effluent from said dehydrogenation treatment to about 150° F.; separating thus cooled effluent into an aqueous phase and an organic phase; fractionating the organic phase to recover as bottoms 2,5-divinyl pyridine; recovering as overhead from said fractionation a mixture containing unreacted 2,5-diethyl pyridine and about 5 per cent by weight of vinyl pyridine; subjecting the thus recovered mixture to a thermal polymerization at a temperature in the range of 550 to 650° F. for a period in the range of 15 minutes to 5 hours and under a pressure sufficient to maintain the reacting mixture in a liquid phase to polymerize substantially all the vinyl pyridine therein; sepaarting thus formed polymer from unreacted 2,5-diethyl pyridine by flash distillation; and recycling said unreacted 2,5-diethyl pyridine to the first step of the process.

12. A process for the production of 3-vinyl pyridine which comprises pretreating 3-ethyl pyridine by vaporizing and admixing with superheated steam; subjecting the gaseous mixture to a catalytic dehydrogenation treatment at a temperature in the range of 1200 to 1300° F. and a pressure in the range of 20 to 40 p. s.i. in the presence of a dehydrogenation catalyst; cooling the effluent from said dehydrogenation treatment to about 150° F.; separating thus cooled effluent into an aqueous phase and an organic phase; fractionating the organic phase to recover as bottoms 3-vinyl pyridine; recovering as overhead from said fractionation a mixture containing unreacted 3-ethyl pyridine and about 5 per cent by weight of 3-vinyl pyridine; subjecting the thus recovered mixture to a thermal polymerization at a temperature in the range of 550 to 650° F. for a period in the range of 15 minutes to 5 hours and under a pressure sufficient to maintain the reacting mixture in the liquid phase to polymerize substantially all of the vinyl pyridine therein; separating thus formed polymer from unreacted 3-ethyl pyridine by flash distillation; and recycling said unreacted 3-ethyl pyridine to the first step of the process.

13. A process for the production of 3-propenyl pyridine which comprises pretreating 3-propyl pyridine by vaporizing and admixing with superheated steam; subjecting the gaseous mixture to a catalytic dehydrogenation treatment at a temperature in the range of 1200 to 1300° F. and at a pressure in the range of 20 to 40 p. s. i. in the presence of a dehydrogenation catalyst; cooling the effluent from said dehydrogenation treatment to about 150° F.; separating said effluent into an aqueous phase and an organic phase; fractionating the organic phase to recover as bottoms 3-propenyl pyridine; recovering as overhead from said fractionation a mixture containing unreacted 3-propyl pyridine and about 5 per cent by weight of 3-propenyl pyridine; subjecting the thus recovered mixture to a thermal polymerization at a temperature in the range of 550 to 650° F. for a period in the range of 15 minutes to 5 hours and under a pressure sufficient to maintain the reacting mixture in the liquid phase to polymerize substantially all the 3-propenyl pyridine therein; separating thus formed polymer from unreacted 3-propyl pyridine by flash distillation; and recycling said unreacted 3-propyl pyridine to the first step of the process.

No references cited.